July 21, 1959

T. H. RISK 2,895,767

ALUMINUM WHEEL MOUNTING

Filed Feb. 3, 1958

T. H. RISK
INVENTOR.

BY E. C. McRae
J. R. Faulkner
J. H. Oster

ATTORNEYS

United States Patent Office 2,895,767
Patented July 21, 1959

2,895,767

ALUMINUM WHEEL MOUNTING

Thomas H. Risk, Birmingham, Mich., assignor to Ford Motor Company, Dearborn, Mich., a corporation of Delaware Application February 3, 1958, Serial No. 712,734

5 Claims. (Cl. 301—9)

This invention relates generally to vehicle wheels and has particular reference to an improved construction and arrangement for coupling the wheel to the axle for the transmittal of the driving or braking torque.

Disc wheels and rims, which are stud mounted on the hubs and drums, are used on most current model automobiles. Generally, five mounting studs equally spaced on a stud-circle are provided on each hub and drum to which the wheel is secured by wheel stud nuts. There are at least two objections to this conventional practice. First, for aesthetic reasons the exposed bolt heads or wheel stud nuts must be covered by an ornamental hub cap or wheel cover. Second, the mounting of the wheel in the conventional manner presents practical difficulties. To ensure that the wheel is evenly drawn against the hub and drum, the stud nuts should be alternately tightened. Further, the instruction manual for one current make of automobile directs that the wheel stud nuts should be tightened to 65-70 foot-pounds torque. While the motorist making an emergency wheel change may be familiar with the rule about tightening alternate nuts, it is the rare motorist, indeed, who is provided with a torque wrench for measuring the tightening force being exerted on the wheel stud nuts. The result is that the stud nuts are seldom tightened equally.

The alternative to the conventional practice of securing the wheel on the hub is to use a center securing means, i.e., one in which the wheel is held on the axle by a center nut or nut-like member axially adjustable relative to the axle. Although such center securing means are known in the prior art, the use which has been made of this arrangement has been very limited since a center securing means provides difficulty in coupling the wheel to the hub for transmittal of the driving or braking torques associated therewith.

It is an object of the present invention to provide an improved wheel coupling structure comprising a center securing means and a drive means interposed between the wheel and hub members, the drive means being as effective to transmit driving or braking torque as the conventional wheel studs but not being required to play a direct part in holding the wheel on the hub. The improved construction and arrangement is characterized by its extreme simplicity, low cost of manufacture and ease of installation.

In its illustrated embodiment the present invention comprises a wheel and axle assembly comprising a wheel hub member, a demountable wheel and a fastener removably securing the wheel member at the center thereof. The hub member and wheel member are provided with plane face portions adapted to be positioned in spaced face to face relationship to each other. The hub and wheel members are coupled by driving means radially spaced from the hub member center and located intermediate the opposed face portions of said members, the driving means being effective to transmit driving torque from the hub member to the wheel member.

Further objects, advantages and features of the invention will be apparent from the following detailed description given in conjunction with the accompanying drawings, in which.

Figure 1:
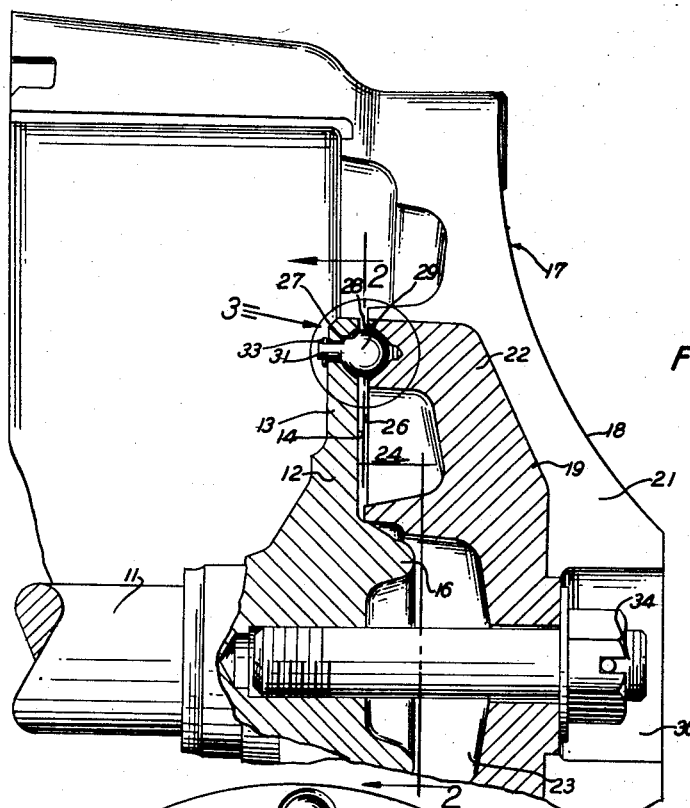
Fig. 1 is a fragmentary horizontal cross sectional view through the wheel hub and axle assembly of the present invention.
Figure 3:
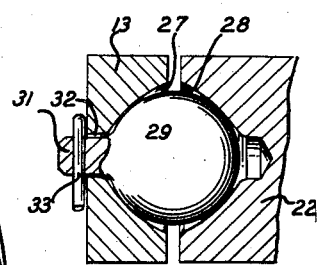
Fig. 3 is an enlarged view of the portion of Fig. 1 within the circle 3.
Figure 2:
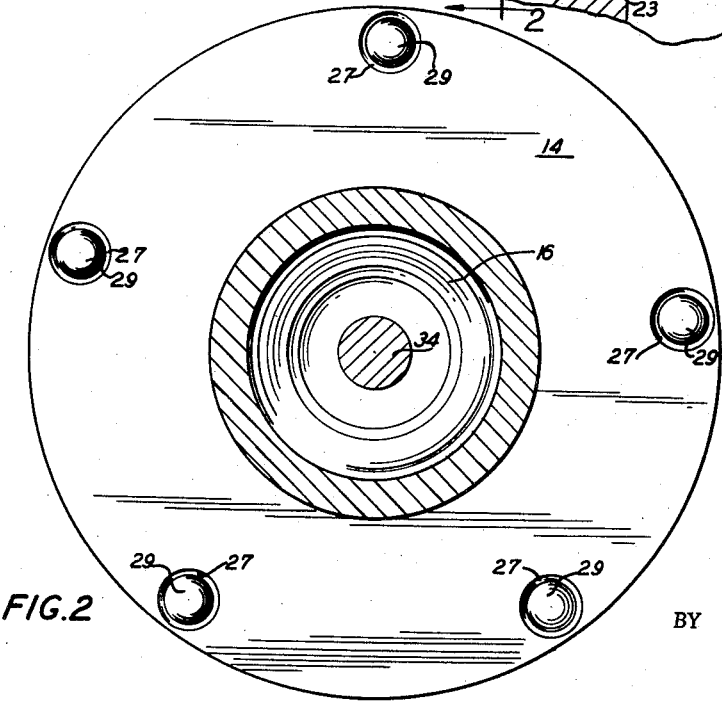
Fig. 2 is a sectional view taken substantially through line 2—2 of Fig. 1 looking in the direction of the arrows.

Referring now to the drawing, the embodiment of the invention herein described is illustrated as applied to the rear axle 11 of a vehicle. The axle 11 carries at its outer end a hub 12 having a radially extending flange 13. Projecting axially outwardly from the front face 14 of the flange is a frusto-conical annular or ring portion 16 adapted to function as a centering or locating means for the wheel, generally designated 17, particularly as the latter is being mounted on the hub.

The wheel 17, only a fragmentary portion of which is shown, may comprise an aluminum disc having its exterior or outer side 18 so formed as to provide a decorative or ornamental appearance. Bonded within a complementary recess 19 on the inner side of the wheel center portion 21 is a steel insert member 22. The steel insert member 22 is substantially equal in diameter to the diameter of the hub flange 13 and is provided with a countersunk center bore or recess 23 adapted to fit over the frusto-conical annular or ring portion 16 of the hub, see Fig. 1. The steel insert member 22 may be provided with a large circular recess or depression 24 extending inwardly from the face 26 thereof to lighten the weight of the member.

The hub flange 13 is provided in its front face 14 near its periphery with five equally spaced semi-spherical recesses 27 located on a circle whose center lies on the longitudinal axis of the axle.

The face 26 of the steel insert member 22 is also provided with an equal number of semi-spherical recesses 28 adapted to be positioned opposite the flange recesses 27 when the wheel and hub are in axial alignment.

The opposed recesses 27 and 28 are adapted to receive steel balls 29, for a purpose to become apparent. While the balls 29 could be true spheres, it has been found that for assembly purposes it is desirable to use a ball having a small shank 31 which loosely fits into a hole 32 at the base of each recess 27 or which may project slightly beyond the flange to receive a wire pin 33 or the like. The balls are thus retained so that they will not fall out of the recesses 27 during assembly or removal of the wheel from the hub. The balls 29 are of a slightly smaller diameter than the diameter of the spherical ball receiving recess formed by the two semi-spherical recesses 27 and 28 when in face to face relation.

A single center bolt or stud and nut device 35 clamps the wheel to the hub. With the wheel clamped to the hub, the steel balls effectively non-rotatably couple the wheel and hub for the transmittal of driving or braking torque from the one to the other. The bolt or stud and nut device 34 may have a spinner handle thereon to provide a "knock-off" wheel such as is used on racing cars to expedite quick removal of the wheel.

It has been found that even though the recesses 27 and 28 may not be exactly aligned with each other, the steel balls 29, which are made of highly tempered steel and which are in tangential contact with the surfaces of the recesses, quickly burnish a seat in the adjacent recess surfaces. The contact area between the ball and adjacent surfaces is thus increased. Since the action of the balls on the metal surfaces of the conical recesses is, in effect, a cold-working of the metal, there is also a resultant increase in the structural strength of the area affected. The increase in contact area and structural strength results in a state of balance being reached at which the burnishing action ceases. This occurs after only a relatively short period of use. The center securing device 34 may then be retightened, if necessary, and the five drive balls will then each share a substantially equal portion of the load.

It will be noted that the diameter of the balls 29 is such that the opposed faces of the hub flange 13 and wheel insert member 22 are always slightly spaced from each other. Thus, even though the two face planes may not be exactly parallel to each other or may have surface irregularities, such deviation will have no effect on the load distribution on the balls. As the center securing means is tightened there will be some deflection of the hub flange 13. If desired, the flange deflection may be controlled by a stop at the pilot section 16 in a manner which is believed readily apparent. Also, an index guide may be added to the pilot sections of the hub and wheel so that the latter if removed for any reason will be replaced in the same position it had prior to removal.

The recess 36 shown in the center portion 21 of the wheel, which recess houses the bolt head or stud nut, as the case may be, of the center securing means, may be covered by a suitable ornamental cap (not shown).

Although the present invention is shown applied to the rear axle of an automotive vehicle, it will be readily understood that its principle is applicable to the mounting of all four of the vehicle wheels. The principle is also applicable to wheels manufactured of other metals other than specifically for aluminum wheels provided with a steel insert member, such, for example, as on all steel wheels as now commonly manufactured.

I claim:

1. A wheel and axle assembly comprising a demountable wheel member, a hub member and a fastener removably securing the wheel member to said hub member at the center thereof, said wheel and hub members having opposed face portions in spaced relation to each other, and driving means radially spaced from said center and engaged with said opposed face portions for transmitting driving torque from the one member to the other, said driving means comprising spherical means seated in complementary recesses in said opposed faces.

2. A wheel and axle assembly comprising a demountable wheel member, a hub member and a fastener removably securing the wheel member to said hub member at the center thereof, said wheel and hub members having opposed face portions in spaced relation to each other, driving means radially spaced from said center and engaged with said opposed face portions for transmitting driving torque from the one member to the other, said driving means comprising self-aligning spherical means seated in semi-spherical recesses in said opposed faces, and retaining means securing said spherical means to one of said members to prevent dislodgment prior to the mounting of said wheel member on said hub member.

3. A wheel and axle assembly comprising a demountable wheel member, a hub member and a fastener removably securing the wheel member to said hub member at the center thereof, said hub member having a radially extending flange portion having in one face thereof a series of equally spaced conical recesses lying on a circle near the periphery thereof, said wheel member having a face provided with a complementary series of semi-spherical recesses, and ball means partially seated in opposed recesses when said flange face and wheel member face are opposite each other in the mounted condition of the wheel, said ball means being effective to transmit driving torque from the one member to the other.

4. A wheel and axle assembly comprising a demountable wheel member, a hub member and a fastener removably securing the wheel member to said hub member at the center thereof, said hub member having a radially extending flange portion having in one face thereof a series of equally spaced semi-spherical recesses lying on a circle near the periphery thereof, said wheel member having a face provided with a complementary series of recesses, and ball means partially seated in opposed recesses when said flange face and wheel member face are opposite each other in the mounted condition of the wheel, said ball means each being of equal and sufficiently large diameter to maintain said opposed faces in spaced relation to each other whereby the load during the transmittal of driving torque from the one member to the other is carried wholly on the ball means and is substantially equally distributed thereon.

5. A wheel and axle assembly comprising a demountable wheel member, a hub member and a fastener removably securing the wheel member to said hub member at the center thereof, said wheel and hub members having opposed face portions in spaced relation to each other, and driving means radially spaced from said center and engaged with said opposed face portions for transmitting driving torque from the one member to the other, said driving means comprising spherical means seated in semi-spherical recesses in said opposed faces, each of said spherical means being of equal and sufficiently large diameter to maintain said opposed faces in spaced relationship whereby the load exerted by the securing fastener is wholly carried by and is evenly distributed over each of the spherical means.

References Cited in the file of this patent

UNITED STATES PATENTS 1,846,079      Bellamore             Feb. 23, 1932